US010842180B2

(12) United States Patent
Zhang et al.

(10) Patent No.: US 10,842,180 B2
(45) Date of Patent: Nov. 24, 2020

(54) CONTROL METHOD FOR IMPROVING FORMING AND 3D PRECISE PRINTING PERFORMANCE OF THAWED SURIMI SYSTEM

(71) Applicant: Jiangnan University, Wuxi (CN)

(72) Inventors: Min Zhang, Wuxi (CN); Lin Wang, Wuxi (CN); Dongcui Fan, Wuxi (CN); Yuchuan Wang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 388 days.

(21) Appl. No.: 15/871,908

(22) Filed: Jan. 15, 2018

(65) Prior Publication Data
US 2018/0199614 A1 Jul. 19, 2018

(30) Foreign Application Priority Data

Jan. 16, 2017 (CN) .......................... 2017 1 0028438

(51) Int. Cl.
*A23P 20/20* (2016.01)
*B33Y 10/00* (2015.01)
(Continued)

(52) U.S. Cl.
CPC .................. *A23P 20/20* (2016.08); *A23L 5/13* (2016.08); *A23L 11/07* (2016.08); *A23L 17/70* (2016.08);
(Continued)

(58) Field of Classification Search
None
See application file for complete search history.

(56) References Cited

U.S. PATENT DOCUMENTS 4,816,279 A * 3/1989 Katoh ..................... A23P 30/20
366/307
5,188,854 A * 2/1993 Hartman ................. A23L 17/75
426/272
5,344,665 A * 9/1994 Kanayama .............. A23L 17/70
426/643

FOREIGN PATENT DOCUMENTS

CN     104382097 A    3/2015
CN     104856117 A    8/2015
(Continued)

OTHER PUBLICATIONS

English Translation CN 104382097 (Year: 2015).*
English Translation CN 105394801 (Year: 2016).*

*Primary Examiner* — Katherine D Leblanc
(74) *Attorney, Agent, or Firm* — Bayramoglu Law Offices LLC

(57) ABSTRACT

A control method for improving forming and 3D precise printing performance of a thawed surimi system relates to the field of 3D printing food material preparation technologies. In the present invention, steps including thawing, mixing, grinding, performing, printing, setting, and cooking are performed on frozen surimi. A thawed surimi gel system of the present invention can reduce the printing temperature, and increase the discharging rate and the three-dimensional forming rate. In the present invention, an acid-induced surimi gel is formed by adding linseed gum and glucolactone, and the surimi gel has stable viscosity and fluidity. The surimi slurry is minced and does not easily cause blockage, and discharging is smooth. By means of 3D precise printing technology, the surimi gel system of the present invention may be made into a cold dish of fish product that retains original properties and taste of the surimi product.

6 Claims, 1 Drawing Sheet

(51) Int. Cl.
*B33Y 50/02* (2015.01)
*B33Y 70/00* (2020.01)
*A23P 20/25* (2016.01)
*A23L 5/10* (2016.01)
*A23L 11/00* (2016.01)
*A23L 17/00* (2016.01)

(52) U.S. Cl.
CPC ............... *B33Y 10/00* (2014.12); *B33Y 50/02* (2014.12); *B33Y 70/00* (2014.12); *A23P 2020/253* (2016.08); *A23V 2002/00* (2013.01)

(56) References Cited

FOREIGN PATENT DOCUMENTS

| | | |
|---|---|---|
| CN | 104921181 A | 9/2015 |
| CN | 104938738 A | 9/2015 |
| CN | 104997069 A | 10/2015 |
| CN | 105394801 A | 3/2016 |
| CN | 105831198 A | 8/2016 |

* cited by examiner

CONTROL METHOD FOR IMPROVING FORMING AND 3D PRECISE PRINTING PERFORMANCE OF THAWED SURIMI SYSTEM

CROSS REFERENCE TO RELATED APPLICATIONS

This application is based upon and claims priority to Chinese Patent Application No. 201710028438.4, filed on Jan. 16, 2017, the entire contents of which are incorporated herein by reference.

FIELD

The present invention relates to the field of food material preparation technologies using 3D printing, and to a control method for improving forming and 3D precise printing performance of a thawed surimi system.

BACKGROUND

With the rapid development of the 3D printing technology and continuous exploration for application of the 3D printing technology, the application field of the 3D printing technology expands from the conventional mold manufacturing field to the fields such as construction, process design, and medical orthopedics. In the food industry, 3D food presents new applications, which have deep impact on problems such as food supply shortage, personalized demands on foods, human life styles, and space travel.

A food 3D printer is based on fused deposition modeling (FDM), and integrates the 3D printing technology into food manufacturing. First, a designed product shape is entered into Arduino software. The Arduino software can automatically design and generate operating steps of 3D printing, and stacks a raw material in a laminated processing manner according to the preset shape and pattern, to generate a 3D product. Advantages of the 3D printing technology are that an object in any shape can be generated according to computer graphic data without mechanical processing or molds, and a shape that cannot be manufactured by using a conventional food production technology can be manufactured. In addition, a good design concept and a good design procedure greatly shorten the cycle of developing, manufacturing, and processing of a food. As production lines are not used, costs are reduced, and the production efficiency is increased. Therefore, development and application of the 3D printing technology are helpful to promote development of the food industry, and bring a new concept and power to the food production and processing field.

However, selection of a food material is still one of bottlenecks that limits wide application of 3D printing in the food processing field. Food materials suitable for the 3D printing technology are mostly liquid, paste, or powder food materials. Therefore, printing can be implemented only after foods usually ate by people, for example, fish, meats, and vegetables, are made into pastes. In addition, it is required that the pastes have given viscosity, fineness, and rheological characteristic. Surimi products are elastic, have a unique taste, have various flavors, and are convenient and delicious. The surimi products may be used to make different dishes such as salads, minimeals, main dishes, and cold dishes, and are favored by numerous consumers. Meanwhile, the surimi system has given gel strength, viscosity, and theological characteristic, and meets requirements of the 3D printing technology for food materials. However, in the prior art, a disadvantage of the surimi material is high gel strength, which increases a mechanical negative pressure in a printing process, and may cause damage to the 3D printer. The viscosity of the surimi is too high, which can also bring about problems, for example, a nozzle is blocked, the printing precision is reduced, and product quality cannot be guaranteed. Therefore, improving forming and 3D printing performance of a food system by controlling a surimi formulation is of great significance for development of the surimi 3D printing system.

Linseed gum is an anionic polysaccharide composed of six monosaccharides such as xylose, arabinose, galactose, rhamnose, glucose, and fucose, and has strong hydrophilicity. Under a same concentration, viscosity of the linseed gum is significantly lower than that of edible gums that are commonly used in the food industry, for example, locust bean gum, guar gum and xanthan gum. The linseed gum is added to the surimi, to increase the elasticity and rehydration of the surimi gel. The viscosity of the linseed gum is moderate, which facilitates smooth discharging in the 3D printing process. In addition, addition of the linseed gum can increase dietary fiber content in the gel system, so that nutrition of the gel system is more balanced, and digestion characteristics of surimi gel products are improved. As a commonly used acid protein coagulant, glucolactone can be slowly hydrolyzed into gluconic acid and lactone in a high water content system. The gluconic acid can change charge distribution on a side chain of amino acid, so that an action force between protein molecules is enhanced, and protein can be induced to form an acid gel at a lower temperature. The two substances are added to the system, so that a surimi printing material whose gel strength, viscosity, and theological characteristic meet the requirements of 3D printing can be formed at a low temperature.

Fan Daming et al. (Patent Application No. 201410654092.5) disclosed a low-temperature acid-induced surimi product having high gel strength and a production method therefor. By means of slow hydrolysis, glucolactone used in the invention is applied to surimi protein to produce acid-induced gel. Compared with gel strength of a conventional thermal gel, the gel strength of the invention is increased by more than 140%, and the elasticity can be increased by more than 10%. However, the viscosity and the rheological characteristic of the acid-induced protein gel are still to be improved, and cooperation with other gelling agents is needed. In the present invention, linseed gum is added based on acid induction, which is helpful for improving, the viscosity and the rheological characteristic of the surimi gel, and is more conducive to smooth discharging in the 3D printing process.

Li Shuhong et al. (Patent Application No. 201510434109.0) disclosed a fresh fish cake and a preparation method therefor. In the invention, polyphosphate and transglutaminase are used as gelling agents to improve the gelling characteristic of the fish cake. However, when excessive polyphosphate is ingested, the polyphosphate can combine with calcium ions in human intestines, to form a substance that is poorly soluble in water. Consequently, calcium absorption rate is reduced. Moreover, the degree of cross-linking between the transglutaminase and the protein is relatively high, so vicoelasticity of an obtained surimi gel is too high, and blockage easily occurs in the 3D printing process. However, the cross-linking action of the two gelling agents used in the present invention is moderate, and the obtained surimi product also has certain fluidity.

Xuan Xinlong et al. (Patent Application No. 201510380598.6) disclosed a cocoa butter replacer chocolate for 3D printing and a preparation method therefor. In the invention, a chocolate is obtained through steps including material preprocessing, mixing and fine grinding, refining, canning, and melting. The chocolate of the invention has stable fluidity, and does not need temperature adjustment, which simplifies the production process, and has good thermal resistance. The emulsifier used in the invention is soybean lecithin or polyglycerol ricinoleate, and a main function thereof is to reduce stiffness of the chocolate and enhance fluidity of the chocolate slurry. However, the soybean protein emulsion slurry used in the present invention can significantly reduce boundary tension of water, form a stable emulsion system with salt soluble meat protein, and have a good filling property, thereby reducing addition of materials such as starch. According to the present invention, the obtained surimi has good toughness, flexibility, and taste.

Pang Yong (Patent Application No. 201610396341.4) disclosed a vegetable cake material for 3D printing. The vegetable cake material in the invention can increase the heating rate, the melting temperature of a model, and the three-dimensional forming rate during printing. In addition, a toughener, a leveling agent, and others are added to the vegetable cake material, so that the material has stable fluidity, certain viscosity, and a stable forming temperature. However, the toughener, the leveling agent, and others used in the invention are mostly industrial products. However, the soybean protein emulsion slurry used in the present invention improves the fluidity of the material, so that the obtained surimi product is safer.

Chen Long et al. (Patent Application No. 201510705716.6) disclosed a rapid forming method for food 3D printing. In the method, first, a food material is fully mixed with a forming agent A to perform 3D printing, and obtain an intermediate forming material. Meanwhile, a forming spraying agent is uniformly sprayed on the intermediate forming material that is just extruded. The intermediate forming material has a curing reaction with a forming agent B, and a hard thin layer is formed on surface of the food material. After one layer is cured, a work platform moves down by a distance of one layer before continuing to print. The method is not limited by materials, and does not rely on temperature difference to implement solidification and forming. However, the procedure of the method is complex, a printed layer needs to be cured before another layer is printed on the printed layer, so the printing speed is low. However, in the present invention, there is no need to add another forming agent to printed surimi, and the printed surimi is formed after it is placed under a temperature of 37° C. The operation is simple, and the printing efficiency is high.

Tu Zongcai et al. (Patent Application No. 201510253359.4) disclosed a method for enhancing a gelling characteristic of grass carp surimi and improving a taste thereof. In the method, two-stage heating is used, so that the surimi rapidly passes a gel cracking temperature range from 50° C. to 70° C., to avoid surimi gel cracking. In the present invention, the gelification procedure is performed at a low temperature, and steaming is performed after the surimi is formed. The operation is simpler and more convenient.

Bian Zhiying et al. (Patent Application No. 201510273667.3) disclosed a method for preparing a surimi having elasticity and water retention property. In the invention, a natural heat-curdled polysaccharide—curdlan gum, a protease inhibitor, and modified starch are used to develop a surimi product, to replace the phosphate or reduce addition of the phosphate, and better serve pursuits of consumers for hard and safe foods. The curdlan gum forms a gel under a condition of heating. However, in the present invention, the glucolactone is a low-temperature acid-induced gel, and does not need gelification under a high temperature condition, so the operation is simple. In addition, the acid-induced surimi protein gel has higher flowability, and is more applicable to the 3D printing technology.

In the present invention, the linseed gum and the glucolactone are added, and the surimi gel that is formed by means of acid induction has stable viscosity and fluidity. The surimi slurry is minces, meeting the requirements of the 3D printing technology on the food material. The surimi material in the present invention can increase the discharging rate and the three-dimensional forming rate of 3D printing. In addition, discharging is smooth, and blockage rarely occurs, and the printing precision is high. The surimi material may be made into a cold dish of surimi that retains original properties and taste of the surimi product, and has a novel and aesthetic appearance.

SUMMARY

An objective of the present invention is to provide a control method for improving forming and 3D precise printing performance of a thawed surimi system.

A control method for improving forming and 3D precise printing performance of a thawed surimi system, comprising following steps:

(1) thawing: thawing frozen surimi for 10 h to 14 h under a condition of 4° C., so that the surface temperature of the surimi is below 10° C., and the central temperature of the surimi is below −3° C.;

(2) grinding: first performing empty grinding on the surimi obtained in step (1) for 5 min to 8 min; adding a water-retaining agent and salt accounting for 1.0% to 1.5% of a weight of the surimi, and salt grinding the surimi for 10 min to 12 min; and then adding a gelling agent, and finally adding ingredients to perform mixed grinding for 5 min to 8 min;

(3) preforming: placing the surimi obtained after grinding in step (2) in a thermostatic chamber of 37° C. to be settled for 30 min, to obtain a low-temperature acid-induced surimi product, adding surimi slurry into a material chamber for 3D printing after pre-gelification is completed, and entering a printing step;

(4) printing: importing the surimi slurry obtained in step (3) into a feeding chamber of a 3D primer, selecting a printing pattern, setting a discharging rare between 0.002 cm$^3$/s and 0.006 cm$^3$/s, a printing temperature between 30° C. and 34° C., and a printing speed between 24 mm/s and 28 mm/s, and starting laminated printing according to a model set by Arduino software;

(5) setting: settling the product that is obtained after the printing is completed and that has a three-dimensional shape for 30 min under a room temperature ranging for 20° C. to 25° C., and performing setting; and (6) cooking: place the surimi product that is obtained after the setting is completed and that has the three-dimensional shape into a 100° C. water bath to perform steaming for 10 min to 15 min, preventing a single surface of the product from contacting excessive moisture during the steaming process, and after the steaming, taking out the product and placing the product in a plate.

In step (2), the empty grinding, the salt grinding, and the mixed grinding are all performed for three to five times, and for each time, cutting is performed for 30 s to 40 s, and the grinding is stopped for 30 s, to control a temperature of the surimi below 10° C.

The water-retaining agent described in step (2) comprises 0.4% to 1.0% monoglyceride and 0.4% to 0.8% sodium citrate on basis of the surimi weight.

The gelling agent described in step (2) comprises 1.0% to 1.5% linseed gum and 4.5% to 7.5% glucolactone on basis of the surimi weight.

The ingredients described in step (2) comprise 4% to 8% soybean oil, 5% to 10% corn starch, 8% to 12% soybean protein emulsion slurry, 0.4% to 0.6% sucrose, and 0.4% to 0.6% monosodium glautamate on basis of the surimi weight.

The soybean protein emulsion slurry is emulsion slurry that is obtained after soybean isolate protein powder and water are mixed in a mass ratio of 1-1.5:5 and emulsion is performed for 5 min to 6 min.

Beneficial effects of the present invention: 1. Acid-induced surimi gel is formed by adding the linseed gum and the glucolactone, to obtain slurry having moderate viscosity and good fluidity. The slurry is minces, does not easily cause blockage, and is a best material for 3D food printing. 2. A printing material of the present invention does not need accurate temperature control, simplifying the printing process, reducing requirements on environment control during use, and improving adaptability and operability of 3D printing. 3. The three-dimensional forming rate of a printed product is high, so cold dishes having diversified ideas, high precision, and unique appearance can be prepared. The product is completely free from limitations of molds, and meets personalized demands of people on foods.

DETAILED DESCRIPTION

The following further describes the present invention in detail with reference to embodiments. The embodiments are merely for describing the present invention, but do not limit the scope of the present invention.

Figure 1:
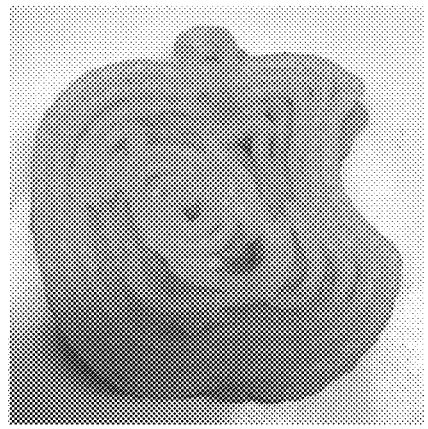
FIG. 1 is a 3D printing forming diagram of Embodiment 1.

Embodiment 1: A Control Method for Improving Forming and 3D Precise Printing Performance of a Thawed Surimi System First, frozen silver carp surimi was thawed for 10 h under a condition of 4° C., so that the surface temperature of the surimi was below 10° C., and the central temperature of the surimi was below −3° C. Subsequently, empty grinding was performed on the surimi for 5 min. 0.6% monoglyceride and 0.8% sodium citrate of the surimi weight were added, 1.5% salt was added, and then salt grinding was performed for 10 min, so that salt soluble protein in the surimi was dissolved out, to increase the gel strength of the surimi. 7.5% glucolactone and 1.5% linseed gum were added and used as a gelling agent, and then ingredients such as 6% corn starch, 6% soybean oil, 10% soybean protein emulsion slurry, 0.4% sucrose, and 0.6% monosodium glautamate were added, and mixed grinding was performed for 5 min. The surimi after the grinding was placed in a thermostatic chamber of 37° C. to be settled for 30 min, to obtain a low-temperature acid-induced surimi product having certain gel strength. Subsequently, the surimi was added to a 3D printing material chamber, a printing pattern was selected, and printing parameters were set. For example, a discharging rate was set to 0.004 cm$^3$/s, a printing temperature was set to 32° C., and a printing speed was set to 24 mm/s, laminated printing was started according to a model set by Arduino software. After the printing was completed, a product having a three-dimensional shape was settled for 30 min under room temperature (25° C.) (FIG. 1), so that surimi myofibrillar protein between layers of the printed product was reconnected to form a more stable surimi gel system. Finally, the surimi product was placed into 100° C. water bath and steamed for 15 min, a single surface of the product was prevented from contacting excessive moisture during the steaming process, and after the steaming, the product was taken out and placed in a plate. For surimi slurry that was obtained by using the method, the gel strength was 342.24 g·cm, the viscosity was 825.68, the 3D printing bar breaking rate was reduced to 12%, and the three-dimensional forming rate was increased to 84%.

Figure 2:
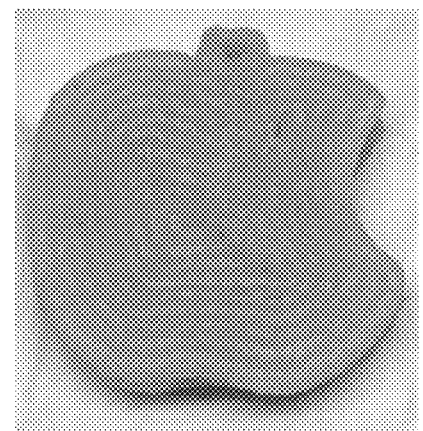
FIG. 2 is a 3D printing forming diagram of Embodiment 2.

Embodiment 2: A Control Method for Improving Forming and 3D Precise Printing Performance of a Sea Surimi System First, frozen hairtail surimi was thawed for 10 h under a condition of 4° C., so that the surface temperature of the surimi was below 10° C., and the central temperature of the surimi was below −3° C. Subsequently, empty grinding was performed on the surimi for 5 min. 0.4% monoglyceride and 0.6% sodium citrate of the surimi weight were added, 1.0% salt was added, and then salt grinding was performed for 10 min, so that salt soluble protein in the surimi was dissolved out, to increase the gel strength of the surimi. 5.5% glucolactone and 1.0% linseed gum were added and used as a gelling agent, and then ingredients such as 5% corn starch, 4% soybean oil, 12% soybean protein emulsion slurry, 0.4% sucrose, and 0.5% monosodium glautamate were added, and mixed grinding was performed for 5 min. The surimi after the grinding was placed in a thermostatic chamber of 37° C. to be settled for 30 min, to obtain a low-temperature acid-induced surimi product having certain gel strength. Subsequently, the surimi was added to a 3D printing material chamber, a printing pattern was selected, and printing parameters were set. For example, a discharging rate was set to 0.006 cm$^3$/s, a printing temperature was set to 32° C., and a printing speed was set to 26 mm/s, laminated printing was started according to a model set by Arduino software. After the printing was completed, a product having a three-dimensional shape was settled for 30 min under room temperature (25° C.) (FIG. 2), so that surimi myofibrillar protein between layers of the printed product was reconnected to form a more stable surimi gel system. Finally, the surimi product was placed into 100° C. water bath and steamed for 15 min, a single surface of the product was prevented from contacting excessive moisture during the steaming process, and after the steaming, the product was taken out and placed in a plate. For surimi slurry that was obtained by using the method, the gel strength was 384.54 g·cm, the viscosity was 901.92, the 3D printing bar breaking rate was reduced to 8%, and the three-dimensional forming rate was increased to 90%.

Figure 3:
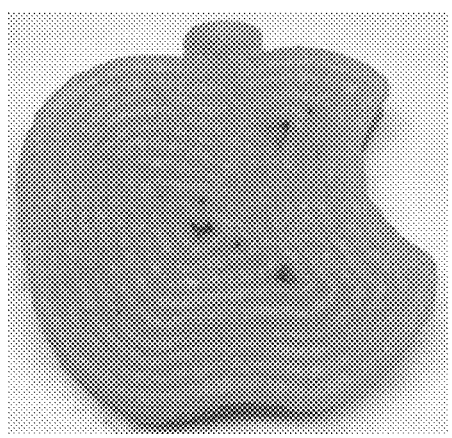
FIG. 3 is a 3D printing forming diagram of Embodiment 3.

Embodiment 3: A Control Method for Improving Forming and 3D Precise Printing Performance of a High Starch Surimi System First, frozen silver carp surimi was thawed for 10 h under a condition of 4° C., so that the surface temperature of the surimi was below 10° C., and the central temperature of the surimi was below −3° C. Subsequently, empty grinding was performed on the surimi for 5 min. 0.8% monoglyceride and 0.6% sodium citrate of the surimi weight were added, 1.5% salt was added, and then salt grinding was performed for 10 min, so that salt soluble protein in the surimi was dissolved out, to increase the gel strength of the surimi. 7.5% glucolactone and 1.5% linseed gum were added and used as a gelling agent, and then ingredients such as 10% corn starch, 8% soybean oil, 12% soybean protein emulsion slurry, 0.6% sucrose, and 0.6% monosodium glautamate were added, and mixed grinding was performed for 5 min. The surimi after the grinding was placed in a thermostatic chamber of 37° C. to be settled for 30 min, to obtain a low-temperature acid-induced surimi product having certain gel strength. Subsequently, the surimi was added to a 3D printing material chamber, a printing pattern was selected, and printing parameters were set. For example, a discharging rate was set to 0.002 cm$^3$/s, a printing temperature was set to 34° C. and a printing speed was set to 24 mm/s, laminated printing was started according to a model set by Arduino software. After the printing was completed, a product having a three-dimensional shape was settled for 30 min under room temperature (25° C.) (FIG. 3), so that surimi myofibrillar protein between layers of the printed product was reconnected to form a more stable surimi gel system. Finally, the surimi product was placed into 100° C. water bath and steamed for 12 mm, a single surface of the product was prevented from contacting excessive moisture during the steaming process, and after the steaming, the product was taken out and placed in a plate. For surimi slurry that was obtained by using the method, the gel strength was 451.36 g·cm, the viscosity was 938.45, the 3D printing bar breaking rate was reduced to 4%, and the three-dimensional forming rate was increased to 95%.

What is claimed is:

1. A control method for improving forming and 3D precise printing performance of a thawed surimi system, comprising:
    (1) thawing: thawing frozen surimi for 10 h to 14 h under a condition of 4° C., so that a surface temperature of the surimi is below 10° C., and a central temperature of the surimi is below 3° C.;
    (2) grinding: first performing grinding on the surimi obtained in step (1) for 5 min to 8 min; adding a water-retaining agent and salt accounting for 1.0% to 1.5% of a weight of the surimi, and salt grinding the surimi for 10 min to 12 min; and then adding a gelling agent, wherein the gelling agent comprises 1.0% to 1.5% linseed gum and 4.5% to 7.5% glucolactone on basis of the surimi weight and finally adding ingredients to perform mixed grinding for 5 min to 8 min;
    (3) preforming: placing the surimi obtained after grinding in step (2) in a thermostatic chamber of 37° C. to be settled for 30 min, to obtain an acid-induced surimi product, adding the surimi product into a material chamber for 3D printing after pre-gelification is completed, and entering a printing step;
    (4) printing: importing the surimi product obtained in step (3) into a feeding chamber of a 3D printer, selecting a printing pattern, setting a discharging rate between 0.002 cm$^3$/s and 0.006 cm$^3$/s, a printing temperature between 30° C. and 34° C., and a printing speed between 24 mm/s and 28 mm/s, and starting laminated printing according to a model set by software;
    (5) setting: setting the surimi product that is obtained after the printing is completed and that has a three-dimensional shape for 30 min under a room temperature ranging from 20° C. to 25° C., and performing setting; and
    (6) cooking: placing the surimi product that is obtained after the setting is completed and that has the three-dimensional shape into a 100° C. water bath to perform steaming for 10 min to 15 min, and after the steaming process, taking out the surimi product and placing the surimi product in a plate.

2. The control method for improving forming and 3D precise printing performance of the thawed surimi system according to claim 1, wherein in step (2), the grinding, the salt grinding, and the mixed grinding are all performed for three to five times, to control a temperature of the surimi below 10° C.

3. The control method for improving forming and 3D precise printing performance of the thawed surimi system according to claim 1, wherein the water-retaining agent described in step (2) comprises 0.4% to 1.0% monoglyceride and 0.4% to 0.8% sodium citrate on basis of the surimi weight.

4. The control method for improving forming and 3D precise printing performance of the thawed surimi system according to claim 1, wherein the linseed gum is 1.5% and the glucolactone is 7.5% on basis of the surimi weight.

5. The control method for improving forming and 3D precise printing performance of the thawed surimi system according to claim 1, wherein the ingredients described in step (2) comprise 4% to 8% soybean oil, 5% to 10% corn starch, 8% to 12% soybean protein emulsion slurry, 0.4% to 0.6% sucrose, and 0.4% to 0.6% monosodium glautamate on basis of the surimi weight.

6. The control method for improving forming and 3D precise printing performance of the thawed surimi system according to claim 5, wherein the soybean protein emulsion slurry is emulsion slurry that is obtained after soybean isolate protein powder and water are mixed in a mass ratio of 1-1.5:5 and emulsion is performed for 5 min to 6 min.

* * * * *